(12) United States Patent
Hartnell

(10) Patent No.: US 8,905,328 B2
(45) Date of Patent: Dec. 9, 2014

(54) LIGHT CLEANING DEVICE

(75) Inventor: Paul Hartnell, Aberdare (GB)

(73) Assignee: Kautex Textron GmbH & Co. KG, Bonn (DE)

( * ) Notice: Subject to any disclaimer, the term of this patent is extended or adjusted under 35 U.S.C. 154(b) by 409 days.

(21) Appl. No.: 12/992,367

(22) PCT Filed: May 14, 2008

(86) PCT No.: PCT/EP2008/003846
§ 371 (c)(1),
(2), (4) Date: Mar. 14, 2011

(87) PCT Pub. No.: WO2009/138105
PCT Pub. Date: Nov. 19, 2009

(65) Prior Publication Data
US 2011/0155823 A1    Jun. 30, 2011

(51) Int. Cl.
*B05B 1/10* (2006.01)
*B60S 1/46* (2006.01)
*B05B 15/10* (2006.01)
*B60S 1/60* (2006.01)
*B60S 1/52* (2006.01)

(52) U.S. Cl.
CPC . *B60S 1/528* (2013.01); *B60S 1/603* (2013.01)
USPC ............. 239/284.2; 239/284.1; 239/203; 239/204

(58) Field of Classification Search
CPC ............................... B60S 1/522; B60S 1/528
USPC ................ 239/284.1, 284.2; 277/309, 355
See application file for complete search history.

(56) References Cited

U.S. PATENT DOCUMENTS

| 3,282,508 | A | * | 11/1966 | Roberts | 239/204 |
| 4,955,543 | A | * | 9/1990 | Orth et al. | 239/284.2 |
| 5,605,286 | A | * | 2/1997 | Orth et al. | 239/284.2 |
| 5,762,271 | A | * | 6/1998 | Lind et al. | 239/284.2 |

(Continued)

FOREIGN PATENT DOCUMENTS

| DE | 19824085 | 12/1999 |
| EP | 1180459 | 2/2002 |

(Continued)

OTHER PUBLICATIONS

International Search Report and Written Opinion dated Feb. 19, 2009 issued in related International Patent Application No. PCT/EP2008/003846.

*Primary Examiner* — Len Tran
*Assistant Examiner* — Alexander M Valvis
(74) *Attorney, Agent, or Firm* — Grossman Tucker Perreault & Pfleger, PLLC

(57) ABSTRACT

The invention refers to a headlamp cleaning device for motor vehicles comprising an elongate housing (2) formed with an inlet port (3) connectable to a source of pressurized cleaning fluid and a retractable hollow cleaning liquid supply tube (4) slidably arranged within the housing (2) and being biased in the retracted position, at least one spray nozzle (6) provided at the distal end of the cleaning fluid supply tube (4) and a fluid valve (22) at the proximal of the cleaning liquid supply tube (4) allowing ingress of the cleaning fluid into the tube once the fluid pressure exceeds a predetermined amount, the fluid valve being designed as a resilient closure cap which at the same time functions as a piston seal for the cleaning fluid supply tube (4) (FIG. 3).

4 Claims, 5 Drawing Sheets

(56) References Cited

U.S. PATENT DOCUMENTS

Figure 2:
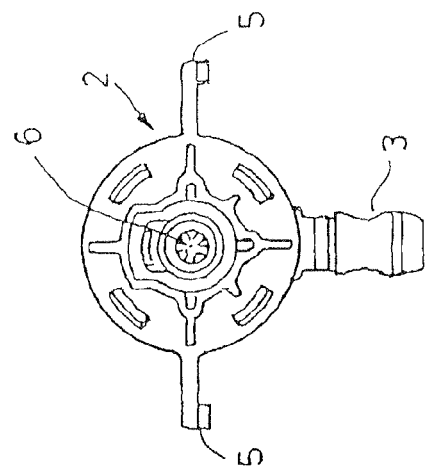

| | | | |
|---|---|---|---|
| 6,454,184 B1 * | 9/2002 | Merkel et al. | 239/284.1 |
| 6,752,329 B1 * | 6/2004 | Price | 239/284.2 |
| 6,905,078 B1 | 6/2005 | Gattuso | |
| 7,093,317 B1 * | 8/2006 | Zimmer | 15/250.04 |
| 2005/0150982 A1 | 7/2005 | Lopez et al. | |
| 2005/0151322 A1 * | 7/2005 | Kobayashi et al. | 277/309 |
| 2007/0228663 A1 * | 10/2007 | Oida et al. | 277/355 |
| 2008/0210780 A1 * | 9/2008 | Discher et al. | 239/284.2 |

FOREIGN PATENT DOCUMENTS

| | | |
|---|---|---|
| FR | 2836842 | 9/2003 |
| WO | 03095277 | 11/2003 |
| WO | 2007091249 | 8/2007 |

* cited by examiner

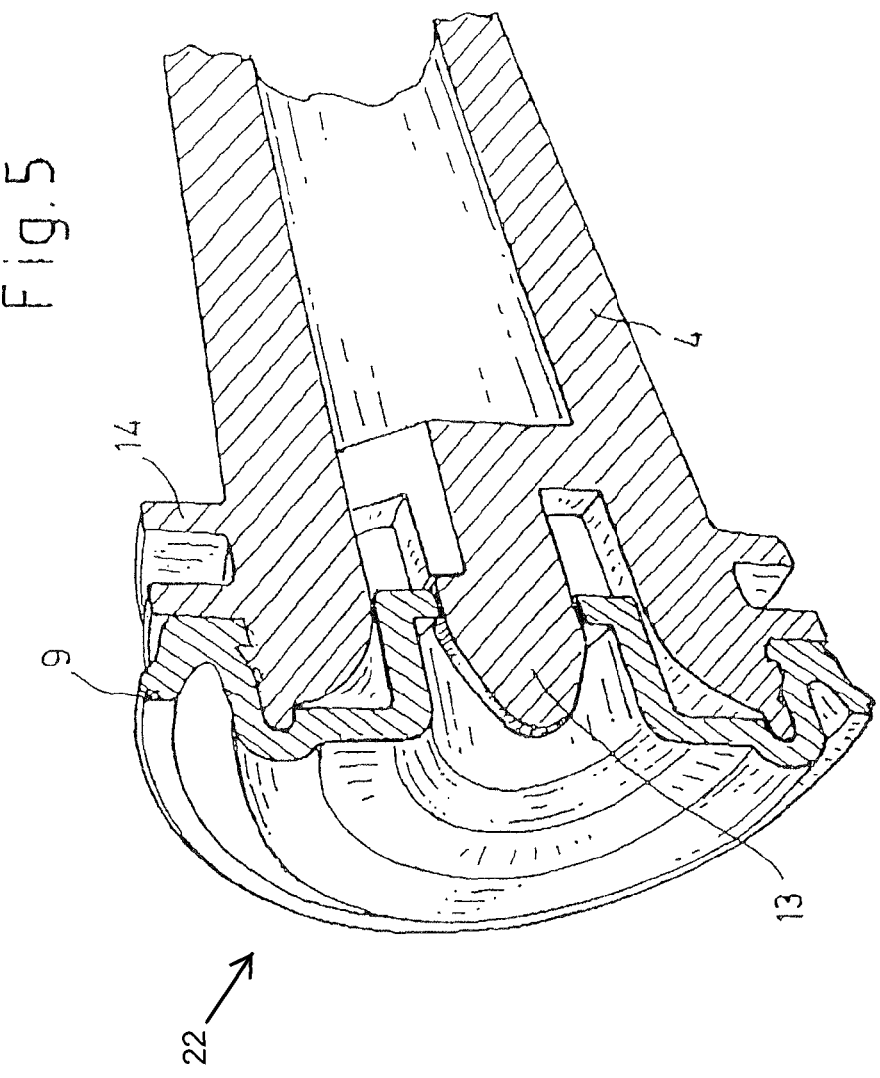
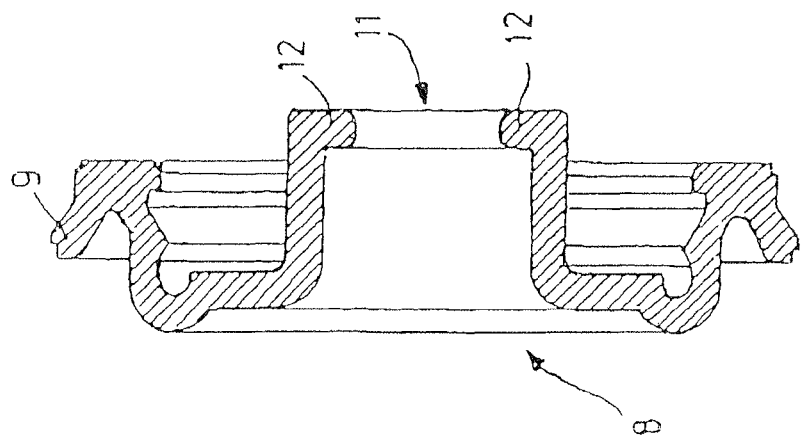

LIGHT CLEANING DEVICE

The present invention refers to a light cleaning device, in particular to a headlamp cleaning device for motor vehicles comprising an elongate housing formed with an inlet port connectable to a source of pressurized cleaning fluid, a retractable hollow cleaning liquid supply tube slidably arranged within the housing and being biased in the retracted position, at least one spray nozzle provided at the distal end of the cleaning fluid supply tube and a fluid valve at the proximal end of the cleaning liquid supply tube allowing ingress of the cleaning fluid into the tube once the fluid pressure exceeds a predetermined amount.

Such telescopic headlamp cleaning devices are generally known in the art. Telescopic headlamp cleaning devices are normally arranged in concealed fashion below a part of the vehicle structure, for instance concealed by a cover plate or flap in a bumper of the vehicle.

DE 198 24 085 A1 discloses a nozzle lifting arrangement for a headlamp cleaning device of the above-referred kind.

WO 07/091249 A discloses a light cleaning device of the above-referred kind for washing lights located on an external portion of a vehicle. The device has an elongate housing formed with an inlet port connectable to a source of pressurized liquid and a rinsing head fitted with at least one jet nozzle. The jet nozzle is mounted at a distal end of the telescopically retractable hollow tube of the device, which is normally retracted. There is a liquid flow path from the housing to the rinsing head which can emit a jet spray therefrom when the tube is projected from the housing.

U.S. Pat. No. 6,905,078 B discloses a spraying device comprising a housing containing a top and bottom portion defining a chamber therein for fluid ingress and egress into the bottom portion wherein the housing includes an outer structure containing an inner structure, and a tensioning device which releasably positions the outer structure at the housing bottom. The inner structure is engaged to an arm member for spraying said fluid, such that the inner structure causes the arm member to move in a linear and rotating relationship relative to the housing. The outer structure and inner structure are engaged to one another such that the outer structure causes the inner structure to move in a linear and rotating relationship relative to the housing. The ingress of fluid in the chamber causes the inner and outer structures to move linearly and at a predetermined point the inner structure is prevented from moving in the linear direction while the outer structure continues to move linearly, thereby causing said inner structure to rotate.

Modern headlamp cleaning systems no longer employ wipers, but rather the headlamp cover is only cleaned by a jet of cleaning fluid which is discharged under pressure from a spray nozzle. Normally it is desirable to arrange the spray nozzle in a concealed fashion. For that purpose, provided in the region of the headlamps in the bodywork or in the bumper is an opening from which the spray nozzle can be telescopically extended. Those headlamp cleaning devices are also known as so-called "pop-up nozzles". One or several nozzles are fixed on a telescopic cylinder arrangement which is held in the retracted position by means of a return spring. The cylinder arrangement can be hydraulically actuated by the way of the pressure of the cleaning fluid, in which case firstly the pressure of the return spring acting on the cylinder has to be overcome upon extension of the spray nozzle by way of the pressure of the cleaning fluid.

Conventional designs of the telescopic headlamp cleaning devices which use the pressure of the cleaning fluid for extension movement of the nozzles require fluid valves establishing fluid communication with the spray nozzle once the nozzles are in the fully extended position. Conventional designs of headlamp cleaning devices known in the art for this purpose use spring biased non-return valves operated by the fluid pressure. A liquid supply tube slidably arranged within an elongate housing at its trailing end is closed by a retainer cap forming a fluid ingress into the supply tube. The fluid ingress is closed by a diaphragm held by a valve spring in its closed position.

Such conventional design of a liquid cleaning device turned out to be expensive due to the number of moving parts required for controlling the extension movement of the nozzles.

It is therefore an object of the present invention to provide a light cleaning device of the above-referred kind which is simple to manufacture and cost-effective. It is furthermore an object of the present invention to provide a light cleaning device of the above-referred kind with a reduced number of moving parts.

These and other objects are achieved by a light cleaning device, in particular a headlamp cleaning device for motor vehicles, comprising an elongate housing formed with an inlet port connectable to a source of pressurized cleaning fluid, a retractable hollow cleaning liquid supply tube slidably arranged within the housing and spring biased in the retracted position, at least one spray nozzle provided at the distal end of the cleaning supply tube and a fluid valve at the proximal end of the cleaning liquid supply tube allowing ingress of the cleaning fluid into the tube once the fluid pressure exceeds a predetermined amount, the light cleaning device according to the invention being characterized in that the valve is designed as a springless valve.

Springless in the sense of the present application means that the valve is designed such that an additional spring member, for instance a return spring as a coil spring, is not required anymore. Opening of the valve according to the invention is only achieved by positive fluid pressure being applied to its inlet side, and closure, which means return to the original position is only achieved from resultant tensile forces stored within the material of the design.

In one advantageous embodiment of the light cleaning device according to the invention, the supply tube comprises an elastically deformable sealing member sealingly engaging the housing, the sealing member forming a part of the valve. Due to this integration of the valve function and the sealing function in one part, it is achieved that the structure according to the invention is remarkably simplified. The sealing member on the one hand functions as a piston seal for the cleaning liquid supply tube, on the other hand it does form a part of the valve.

In one embodiment of the light cleaning device according to the invention the sealing member is designed as a closure cap of the proximal end of the cleaning liquid supply tube. Accordingly, a retainer member for a separate valve arrangement is not required any longer.

The sealing member may comprise at least one fluid ingress opening which has a surrounding ring being formed as a deflectable sealing lip which in non-pressurized condition sealingly engages a valve seat and may be disengaged from the valve seat by the pressure of the cleaning fluid. It is to be understood that the valve seat may be stationary in relation to the fluid supply tube. The sealing lip may be disengaged from the valve seat only by the fluid pressure and will return to its original closed position only due to the resilience of the material.

In one advantageous embodiment, the sealing member is made from a resilient material such that the sealing lip returns into its closed position by the resultant tensile forces stored within the material upon pressure release.

The valve seat for instance may be defined by a mandrel extending into the fluid ingress opening and having a diameter which at least corresponds to the diameter of the fluid ingress opening.

In one alternative embodiment of the light cleaning device according to the invention, the sealing member comprises at least one fluid ingress opening which has a surrounding sealing rim which is in a non-pressurized condition yieldingly biased against a valve seat in a protruding fashion and which in a pressurized condition due to the resilience of the material assumes a non-protruding position in which fluid communication between at least one spray nozzle and the source of pressurized cleaning fluid is established.

The sealing member according to this design may comprise at least one corrugation concentrically surrounding the fluid ingress opening. The corrugation may be designed such that the sealing rim is yieldingly biased in a protruding fashion by the resilience of the material.

For this embodiment of the light cleaning device according to the invention, the valve seat may be defined by a lid covering the fluid ingress opening and being mounted in a stationary position relative to the liquid fluid supply tube.

Figure 1:
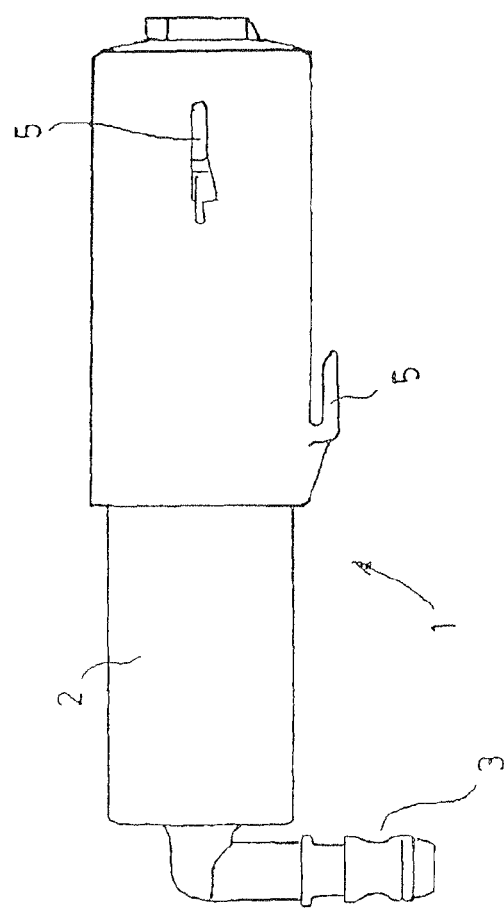
Figure 3:
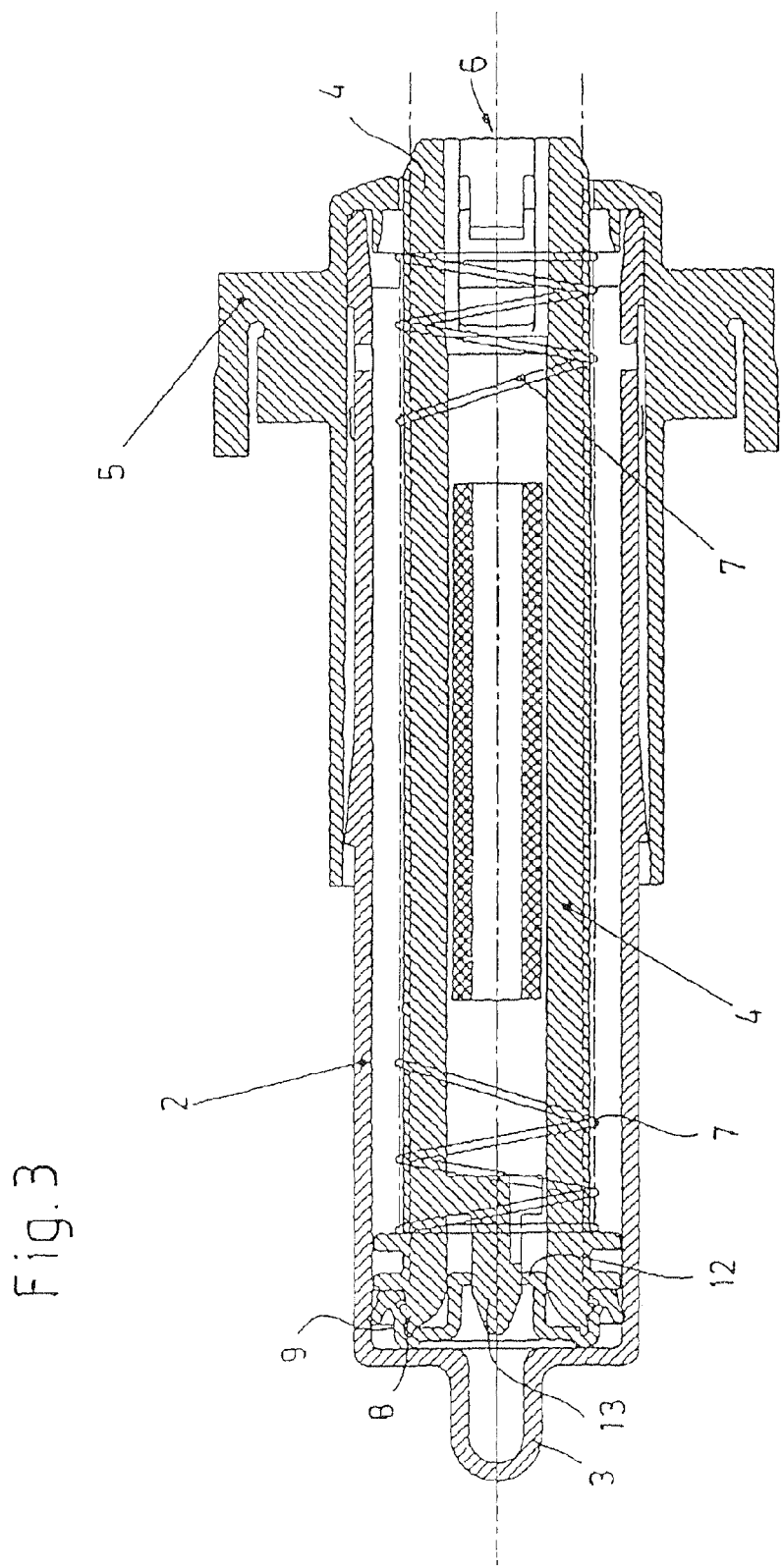
Figure 6:
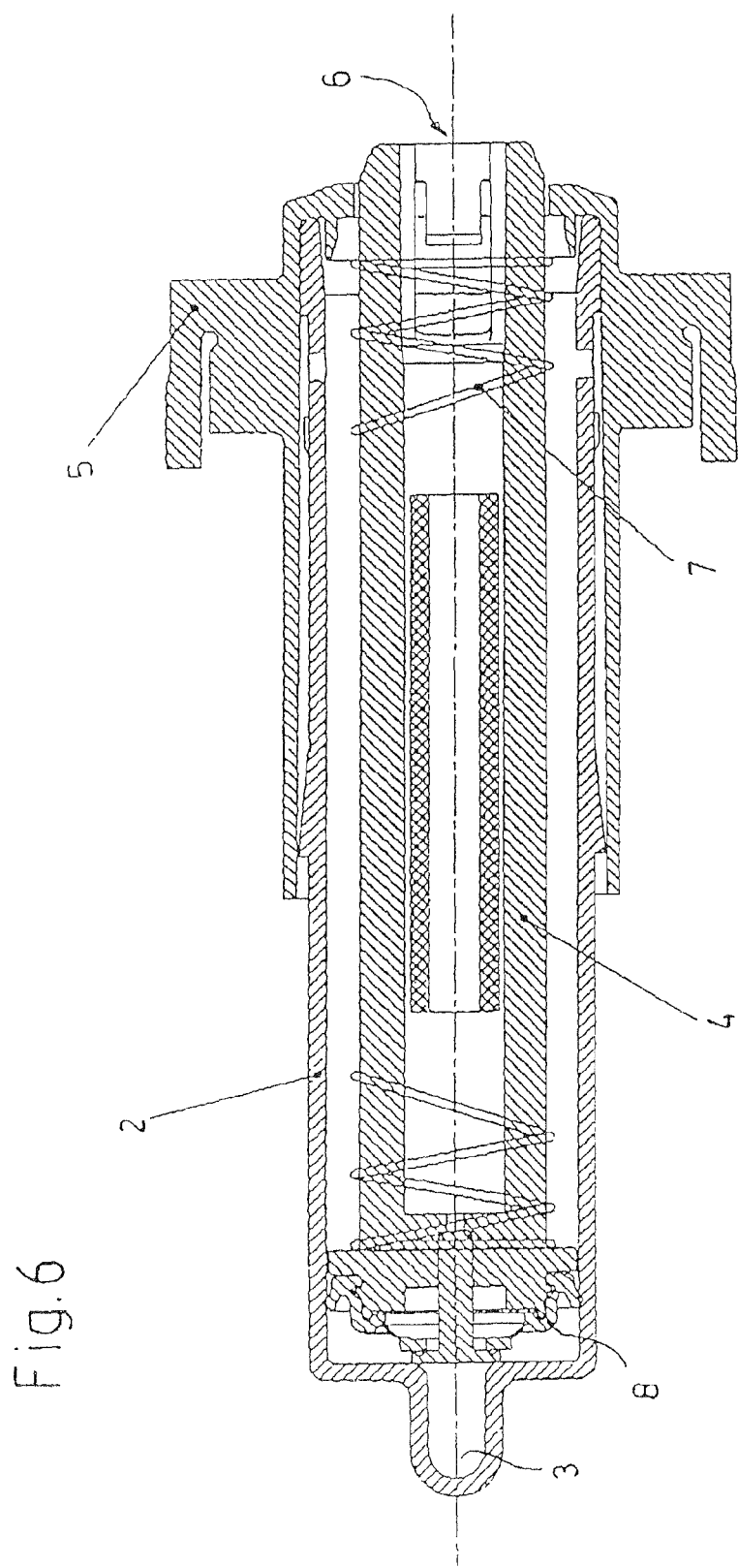
Figure 8:
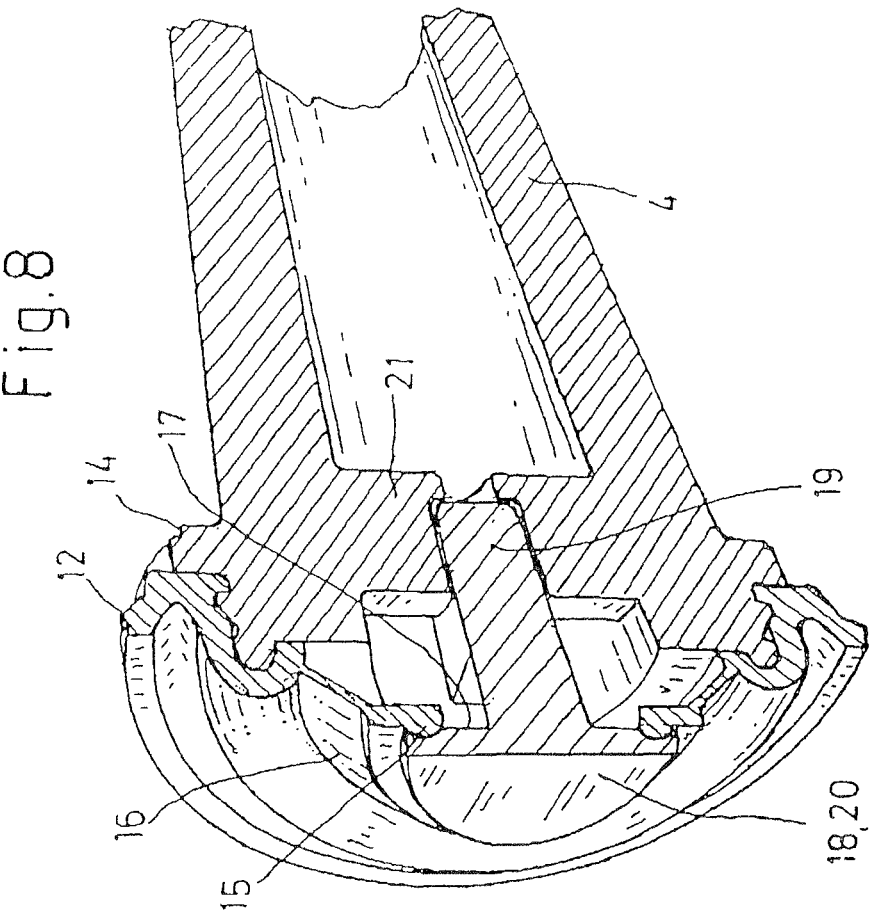
Figure 7:
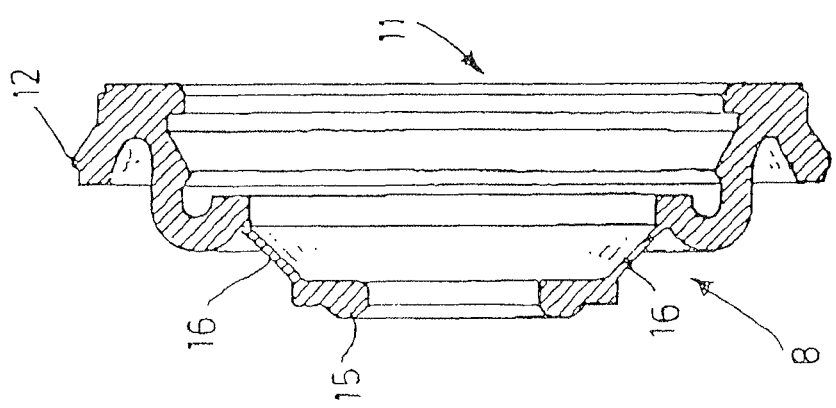

Two embodiments of the liquid cleaning device according to the invention are explained by way of examples with reference to the accompanying drawings in which:

FIG. 1 shows a side elevational view of a first embodiment of the light cleaning device according to the invention, FIG. 2 shows a front elevational view of the light cleaning device shown in FIG. 1, FIG. 3 shows a longitudinal sectional view of the device shown in FIGS. 1 and 2, FIG. 4 shows a cross-sectional view of the sealing member according to a first embodiment of the invention, FIG. 5 shows a schematic sectional view of the liquid supply tube according to the first embodiment of the invention, FIG. 6 shows a longitudinal sectional view of the liquid cleaning device according to a second embodiment of the invention, FIG. 7 shows a cross-sectional view of the sealing member of the headlamp cleaning device of FIG. 6, and FIG. 8 shows a schematic sectional view of the cleaning liquid supply tube according to the second embodiment of the invention.

The light cleaning device 1 according to the invention comprises an elongate cylindrical housing 2 formed with an inlet port 3 connectable to a source of pressurized cleaning fluid (not shown) and a retractable hollow cleaning liquid supply tube 4 slidably arranged within the housing 2.

The light cleaning device 1 according to the invention although referred to as a headlamp cleaning device may also be used as a cleaning device for windshields or other surfaces to be cleaned.

It is to be understood that the light cleaning device 1 may be mounted at the structure of a vehicle in concealed fashion, for instance within the bumper of a car. The inlet port 3 is connected to a cleaning liquid supply tube which is not shown. The cleaning liquid will be supplied via supply tube from a cleaning liquid pump electrically operated. The housing 2 is provided with mounting brackets 5 for installation at the structure of a car. At the leading end (distal end) of the cleaning liquid supply tube 4 one spray nozzle 6 is provided. The cleaning liquid supply tube 4 is designed as a cylindrical hollow tube which is in fluid communication with the spray nozzle 6. It is to be understood that at least one spray nozzle at the leading end of the cleaning liquid supply tube 4 may be provided, i.e. two or more spray nozzles 6 may be present.

FIGS. 1 to 3 show the liquid cleaning device 1 according to the first embodiment of the invention with the cleaning liquid supply tube 4 in a retracted position, i.e. in the non-operating mode.

As this will be explained hereinafter in detail, the cleaning liquid supply tube is moveable to an extended position where the spray nozzle 6 faces a surface to be cleaned, for instance the screen of a vehicle headlamp.

The cleaning liquid supply tube 4 is held in the retracted position by a return spring 7 which abuts against housing 2.

At the trailing end (proximal end) of the cleaning liquid supply tube 4 is a valve 22 (FIG. 5). The supply tube 4 is closed by a sealing member 8 which is designed as a closure cap. The sealing member 8 has an outwardly protruding first sealing lip 9 which is in sealing engagement with the inner wall of the cylindrical housing 2.

As this can be seen from FIGS. 4 and 5, the sealing member 8 has a central opening 11 which is circular.

This sealing member 8 has a cup-shaped inwardly bulged cross-section with a radially inwardly directed second sealing lip 12. The opening 11 defines a fluid ingress opening allowing fluid communication of the inlet port 3 with the inner space of the cleaning fluid supply tube 4. In the non-operated state of the light cleaning device 1, the opening 11 is closed by a mandrel 13 which extends into the opening 11 and which is mounted stationary relative to the cleaning fluid supply tube 4. The diameter of the mandrel 13 approximately corresponds to the diameter of the opening 11. Approximately means that the diameter of the mandrel 13 may be slightly larger than the diameter of the opening 11 so that the second sealing lip 12 may be in sealing engagement with the mandrel 13 in the non-operated state of the cleaning device as shown in FIGS. 3 and 5.

Once the light cleaning device 1 is set under pressure by the ingress of the cleaning fluid supplied from the cleaning fluid pump, the fluid pressure acts on the hydraulically effective surface of the sealing member 8 so that the cleaning liquid supply tube 4 behaves like a closed piston, the sealing member 8 with the first sealing lip 9 acting as a piston seal. The fluid pressure pushes the cleaning liquid supply tube 4 against the biasing force of the return spring 7 in the extended position (not shown in the drawings).

The trailing end of the cleaning liquid supply tube 4 is provided with a peripheral flange 14 which in the extended position abuts the housing 2 so that the fluid pressure may raise and exceed a given limit. The raising pressure causes the second sealing lip 12 to bulge inwardly, thus establishing fluid communication between the inlet ports 3 and the spray nozzle 6.

Once fluid supply to the inlet port 3 is interrupted, the pressure drops and the return spring 7 forces the cleaning liquid supply tube 4 back into the retracted position as shown in FIG. 3.

Due to the resilience of the sealing member 8 which may be for instance made of a TPE (thermoplastic elastomer), the second sealing lip 12 comes again into engagement with the mandrel 13 so that the fluid communication between the inlet port and the spray nozzle 6 is interrupted.

An alternative embodiment of the light cleaning device 1 according to the invention is shown in FIGS. 6 to 8. In the second embodiment of the invention, the same functional components are denoted with the same reference numerals. As this can be taken in particular from FIG. 8, in this embodiment the proximal (trailing) end of the cleaning fluid supply tube 4 is also closed with a cap-like sealing member 8 having a central circular opening 11 for the ingress of the cleaning fluid. The sealing member 8 is made from a resilient material such as the sealing member 8 according to the first embodiment. The periphery of the opening 11 is defined by a ring-like sealing rim 15 which has with respect to the cleaning supply tube 4 an outwardly protruding position. The sealing rim 15 is attached to the main body of the sealing member 8 by a circumferential web 16 of elastic material. The web 16 forms a kind of outwardly bulged corrugation concentrically surrounding the opening 11. The material of the web 16 is less thick than the material of the surrounding material of the sealing member.

In the closed position of the cleaning fluid inlet valve shown in FIG. 8, the sealing rim 15 sealingly abuts a sealing surface 17 of the valve seat 18.

Unlike the first embodiment the valve seat 18 comprises a mounting pin 19 and a sealing lid 20 fixatedly connected thereto. The valve seat has, as this can be seen from FIG. 8, a T-shaped cross-section. The mounting pin 19 is supported within and stationary with respect to the cleaning liquid supply tube 4. For this purpose the cleaning fluid supply tube 4 is provided with an inner supporting collar 21 receiving the mounting pin 19 of the valve seat 18.

Once the fluid pressure acts on the sealing member 8 and exceeds a certain amount, the sealing rim 15 of the sealing member 8 is lifted from the sealing surface 17 of the valve seat 18, forming a gap between the sealing surface 17 and the sealing rim 15 and thus allowing fluid ingress into the cleaning fluid supply tube 4. Once the sealing rim 15 is displaced inwardly, the circumferential web 16 is deformed and bulged inwardly, thereby storing energy due to the deformation of the material. Upon pressure relief the "valve" (sealing rim 15) is pulled back into the closed position, achieved by the resultant tensile forces stored within the material. As in the first embodiment, the sealing member 8 is provided with a circumferential sealing lip 9 for sealing engagement with the inner surface of the cleaning liquid supply tube 4.

REFERENCE NUMERALS

1. Light cleaning device
2. Housing
3. Inlet port
4. Cleaning fluid supply tube
5. Mounting bracket
6. Spray nozzle
7. Return spring
8. Sealing member
9. Sealing lip
10. Inner wall
11. Opening
12. Second sealing lip
13. Mandrel
14. Flange
15. Sealing rim
16. Web
17. Sealing surface
18. Valve seat
19. Mounting pin
20. Sealing lid
21. Supporting collar

What is claimed is:

1. A light cleaning device for motor vehicles comprising:
an elongate housing formed with an inlet port connectable to a source of pressurized cleaning fluid;
a retractable hollow cleaning liquid supply tube slidably arranged within the housing and being biased in a retracted position;
at least one spray nozzle provided at a distal end of the cleaning fluid supply tube;
a fluid valve at a proximal end of the cleaning liquid supply tube allowing ingress of the cleaning fluid into the tube once the fluid pressure exceeds a predetermined amount;
wherein the valve is designed as a springless valve;
wherein the cleaning fluid supply tube comprises an elastically deformable sealing member sealingly engaging the housing, the sealing member forming part of the valve;
wherein the sealing member comprises at least one fluid ingress opening which has a surrounding rim being formed as a deflectable sealing lip which in non-pressurized condition sealingly engages a valve seat and is disengageable from the valve seat by a pressure of the cleaning fluid and in that the sealing member is made from a resilient material such that the sealing lip returns in its closed position by resultant tensile forces stored within its material upon a pressure relief;
wherein the sealing member and valve seat are distinct components;
wherein the valve seat is mounted stationary to the fluid supply tube; and
wherein the valve seat is defined by a mandrel extending into the fluid ingress opening and having a diameter which is at least as large as the diameter of the fluid ingress opening.

2. A light cleaning device according to claim 1, wherein the sealing member is designed as a closure cap of the proximal end of the cleaning fluid supply tube.

3. A light cleaning device according to claim 1, wherein the sealing member comprises at least one corrugation concentrically surrounding the fluid ingress opening, the corrugation being formed as an elastically deformable thin circumferential web.

4. A light cleaning device according to claim 1, wherein the valve seat is defined by a lid covering the fluid ingress opening.

* * * * *